Sept. 26, 1944.        L. W. CHUBB                2,359,085
                    REMOTE INDICATOR
                    Filed July 25, 1942
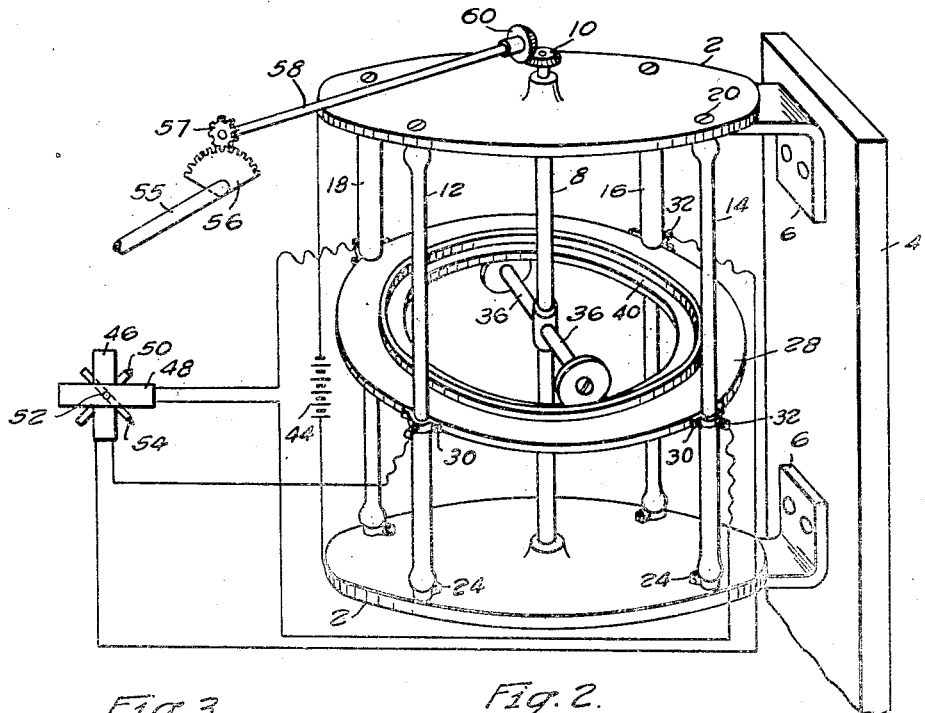
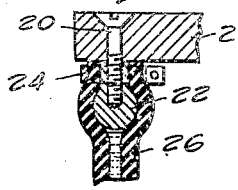
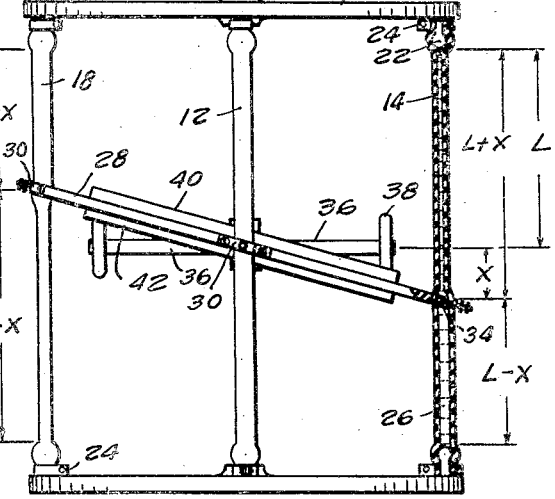
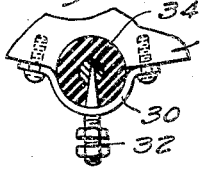
WITNESSES:                                INVENTOR
                                         Lewis W. Chubb.
                                              ATTORNEY

Patented Sept. 26, 1944

2,359,085

UNITED STATES PATENT OFFICE 2,359,085

REMOTE INDICATOR

Lewis W. Chubb, Wilkinsburg, Pa., assignor to Westinghouse Electric & Manufacturing Company, East Pittsburgh, Pa., a corporation of Pennsylvania Application July 25, 1942, Serial No. 452,371

5 Claims. (Cl. 177—351)

The present invention relates to remote indicators and it has particular relation to such devices for remotely reproducing position for purposes of measurement, control or the like.

As is well known, such remote indicators are widely used for measuring temperatures, pressures, speeds and similar purposes. Certain special requirements exist as to systems of this type which are to be used in aircraft, however. Since direct current is frequently used exclusively in such applications, a first requirement is that they operate from this type of power. It is likewise desirable that these indicator systems for aircraft employ no sliding or vibrating contacts because of the vibrations to which they are subjected and the radio interference they may cause. It is further desirable that the device provide indications which are independent of the supply voltage and the temperature because of frequent variations which occur in both these quantities.

The present invention relates to such a remote position indicator which answers all of the above requirements and hence is particularly suitable for aircraft work although it is in no way limited thereto. Broadly, the present device consists of a plurality of elastic tubes which may be of rubber filled with an electrical resistive fluid such as mercury, or an electrolytic such as copper sulphate in water. These tubes are closed at their ends so that the same volume of resistive fluid is always in them and each is provided with a contact member extending through an intermediate portion thereof. By displacing the contact member relative to the ends of the tubes, they are so deformed that the lengths and cross sectional areas of the two portions of each tube are varied to change its resistive properties. In the preferred form, a plurality of these tubes are connected so as to form a pair of bridge circuits, the unbalance of which is controlled by means of a movable member in accordance with its own displacement. A pair of coils disposed in quadrature relationship may be connected to receive the respective unbalance currents and produce a magnetic field which is rotatable to assume a position corresponding to that of a rotatable controlling member.

It is accordingly an object of the present invention to provide a novel and improved indicating system.

Another object of the invention is to provide a remote indicating system employing direct current and requiring no sliding or vibrating contacts.

Still another object of the invention is to provide a remote indicating system transmitter including a group of elastic tubes filled with an electrically resistive fluid and deformable in accordance with the displacement of a movable member to produce a signal representative of its position.

A further object of the invention is to provide a novel and improved variable resistance device.

Other objects and advantages of the invention will appear from the following detailed description read in connection with the accompanying drawing, in which:

Figure 1 is a diagrammatic view with parts in perspective of a preferred form of apparatus embodying the invention;

Fig. 2 is an elevational view, with a portion in section, of the apparatus of Fig. 1 showing the controlling member in a different position;

Fig. 3 is an enlarged vertical sectional view of a portion of the apparatus of Figs. 1 and 2 showing the electrical and mechanical connections for an end of one of the elastic tubes; and Fig. 4 is an enlarged horizontal sectional view of a portion of the apparatus showing the connections of the intermediate contact means of one of the tubes.

Referring particularly to the drawing, a pair of headers 2 of conducting material are supported in spaced relationship from a base 4 by means of bracket members designated as 6. These headers are preferably of circular shape and a rotatable shaft 8 extends through the centers thereof and engages a bevel gear 10 above the upper plates. This shaft 8 may be of non-conducting material or, if desired, may be of metal with insulating bearings at its point of engagement with the two headers, it being essential that it makes no electrical connection therebetween.

Extending between the headers 2 at equally spaced distances about the perimeter thereof are elastic tubes designated as 12, 14, 16 and 18, respectively. As is best shown in Fig. 3, a machine screw 20 may extend through each of the headers or plates for engagement with ball shaped contacts 22 which extend into the ends of each tube. A clamping band 24 engages the end of the tube outside of the contact 22 to retain it in rigid attachment with the adjacent header. Between the ends each of these tubes is filled with an electrical resistive material 26 which may be mercury, for example. A centrally apertured ring member 28 of non-conducting material is attached at spaced points on its periphery to what is normally the midpoint of each of the four tubes when they are in their undeformed and unrestrained condition. These connections may be made by means of arms 30 as is best shown in Fig. 4, and a machine screw extends through each of these arms and through the tube itself at this point. These screws, designated as 32, engage metal contact plates 34 which are such a size as to separate the mercury within the tube into two equal portions irrespective of any deformation of the tube.

To substantially the central portion of the rotatable shaft 8 are secured two diametrically opposed arms 36. To the end of each of these arms is disposed a roller 38 adapted to engage circular track members 40 and 42 disposed on the upper and lower surfaces, respectively, of the ring 28. As shown in the drawing, these arms preferably extend perpendicularly to the shaft 8 and through the opening in the non-conducting ring 28 so that one of the rollers 38 engages the top surface of the ring while the other engages the lower surface. As a result, the ring itself is always in a tilted position with at least some of the tubes in deformed condition due to their connection thereto. The amount and location of this deformation, however, depends upon the rotary position of the shaft 8 and the arms 36 carried thereby.

A direct current voltage source 44 which may be a battery, for example, is connected between the two header members 2 which are otherwise insulated from each other except for the paths through the mercury. The center contact means of each pair of oppositely disposed elastic tubes are connected together through coils 46 and 48 disposed in quadrature relationship to one another. Thus the contact means of the elastic tubes 14 and 18 are connected in series with the coil 48 while the coil 46 is connected across the intermediate connections of the elastic tubes 12 and 16. It will appear that these connections make up a pair of bridge circuits such that the unbalance currents will traverse the coils 46 and 48, respectively.

Disposed within the coils to be acted upon by the resultant field produced thereby is a magnetized armature 50 disposed on a shaft 52 to which is connected an indicating pointer 54 to provide an indication of the position of the core and the direction of the field.

While practically any quantity may be measured by displacing the shaft 8 in accordance with its own magnitude, the apparatus is shown by way of example in the drawing as adapted for remotely indicating the rotary position of a shaft 55 to which is secured a gear segment 56. This shaft may, for example, be attached to the rudder of an airplane to assume a position corresponding to the actual position of the rudder. The gear segment engages a gear 57 to displace a shaft 59 in accordance with its own position. The end of the shaft 58 carries a bevel gear 60 for engagement with the gear 10 on the rotatable shaft 8 to transmit the rudder displacement thereto.

In Fig. 2 of the drawing, the dimensions of the elastic tubes are indicated in terms of L, which represents one-half of the total length of the tube and X which represents the maximum amount which the contact means may be displaced from the tube center. It will appear that the cross-sectional area of the fluid on each side of the contact 34 will vary in inverse proportion to the length. In addition, the resistance between the contact and the end of the tube will vary in direct proportion to the length and in inverse proportion to the cross sectional area. Then if $R_0$ is equal to the resistance of each bridge arm (that is, one-half the length of the elastic tube) when undeflected, the resistance of the two adjacent arms will be (1) $$R_0\left(\frac{L+X}{L}\right)^2$$

(2) $$R_0\left(\frac{L-X}{L}\right)^2$$

This motion will create a change in resistance and result in an unbalanced bridge and will consequently give a variable current through the meter coil. It can be shown mathematically that the current through the meter coil will be (3) $$i_m = \frac{2ELx}{(R_0+R_m)L^2 - (2R_0-R_m)x^2 + \frac{R_0 x^4}{L^2}}$$

where $E$ = battery voltage
$L$ = length of bridge arm (hose) in centimeters
$x$ = displacement of central point
$R_0$ = undeflected bridge arm resistance
$R_m$ = resistance of meter coil If, by way of example, in the above equation for the meter current, the meter resistance $R_m$ is equal to twice the bridge arm resistance $R_0$, the equation reduces to $$i_m = \frac{4EL^3 x}{3R_m L^4 + R_m x^4}$$

It will readily appear that actual rotation of the shaft 8 will give a pure harmonic variation to the value of X, and as a result, the current through the meter coils will approach a true sine wave. As a particular example, this current has been found to be a true sine wave within less than .02 of a percent for a deflection whose maximum amplitude is $X = .3L$.

Since the two Wheatstone bridge circuits made up of the oppositely disposed elastic tubes are independent and are connected to the coils 46 and 48 which are in space quadrature, the actual resultant field produced by these coils will rotate with rotation of the shaft 8 and at any time will assume a position corresponding to its position. As a result the magnetic armature 50 in the apparatus shown in the drawing will assume a position representative of the displacement of the shaft 8 which, in turn, depends upon the position of the shaft 55 and of the rudder indication which drives it.

With the arrangement described above, it can be shown that the moments of force produced by the reaction of the rollers 38 and the forces of the deflected hoses will at all times sum up to zero and in any position of the ring will be perpendicular to the plane determined by the rotatable shaft 8 and the arms 36. At the same time, the potential energy stored up by the deflection of the midpoint of the various hoses will always sum up to the same value. As a consequence, the only work or energy required in turning the shaft 8 is that made necessary by friction and hysteresis in the rubber tubes.

While the particular embodiment of the invention shown by way of illustration relates to a measurement in which a complete rotation of the shaft 8 is unnecessary, it will readily appear that the apparatus may conveniently be adapted to indicate over a full 360° of angular displacement. In addition, the shaft 8 might be attached to be driven by a constantly rotating member, with the result that the field acting upon the armature 50 will rotate at exactly the same speed to permit adaptation of the equipment for speed measurement as well.

As has previously been mentioned, the contact member 34 insures that the same volume of resistive fluid remains on each side thereof when the tubes are deformed. However, the natural deformation of the tube itself tends to cause this condition which brings about the aforementioned resistance relationships. As a consequence the member 34 may be dispensed with and the machine screw 32 relied upon as the sole means for making electrical contact with the resistive fluid.

In some cases it may be preferred to use a non-polarizing electrolyte, such as copper sulfate in water, as the resistance fluid in the resilient tubes. In such a case, pure copper terminals may be employed with satisfactory results because of the relatively small current flow. It is desirable, however, that the battery connections be reversed periodically to prevent migration of metal from the anode to the cathode.

Since these and various other modifications of the apparatus shown and described will appear to those skilled in the art, it is intended that the invention shall be limited only by the spirit and scope of the appended claims.

I claim as my invention:

1. In a remote indicator system, two pairs of elastic tubes closed at their ends and filled with an electrically resistive fluid, means connecting the resistive fluid in each pair of tubes in parallel circuit arrangement, a source of direct current connected to energize the parallel circuits, means extending through each of said tubes into contact with the resistive fluid at substantially its mid-point when in its normal position, and a rotatable member for deforming said tubes and displacing the contact means therealong to provide across the contact means of the pairs of tubes voltages varying substantially harmonically with its rotary position and in quadrature relation to one another.

2. In a remote indicator system, four elastic tubes disposed in parallel relationship at substantially the corners of a square, each of said tubes containing a resistive fluid and being sealed thereabout, a pair of supporting plates each engaging one end of each of said tubes and electrically interconnecting the ends thereof, a source of direct current connected between said supporting plates, means extending through each of said tubes into contact with the resistive fluid at substantially its midpoint when in its normal position, and a rotatable member for deforming said tubes and displacing the contact means of opposite tubes in opposite directions in accordance with its position to produce across the contact means of opposite tubes harmonically varying voltages in quadrature relationship with each other.

3. A remote indicator system comprising four elastic tubes disposed in parallel relationship at substantially the corners of a square, each of said tubes containing an electrically resistive fluid and being sealed thereabout, means electrically interconnecting the corresponding ends of the resistive fluid in said tubes, a source of direct current connected between said interconnecting means, means extending through each of said tubes into contact with the resistive fluid therein at substantially its midpoint when in its normal position, indicating means connected to said contact means to provide an indication corresponding to the relative magnitudes and directions of the voltages provided between the contact means of opposite tubes, and means including a rotatable member for deforming said tubes and displacing the contact means of opposite tubes in opposite directions in accordance with the position of said rotatable member to produce across the contact means of opposite tubes voltages which vary harmonically in accordance with the movement of said rotatable member and in quadrature relationship with each other during such movement.

4. In a remote indicator system, four elastic tubes disposed in parallel relationship at substantially the corners of a square, each of said tubes containing a resistive fluid and being sealed thereabout, a pair of supporting members each engaging one end of each of said tubes and electrically interconnecting the ends thereof, a source of direct current connected between said supporting members, means extending through each of said tubes into contact with the resistive fluid at substantially its midpoint when in its normal position, a centrally apertured control member engaging said tubes at substantially their centers when in their normal undeflected positions, means rotatable about the axis of said control member and extending through the aperture therein for engaging it at diametrically opposite points to tilt it equal amounts in opposite directions in accordance with its own rotative position whereby the voltage across each opposite pair of contact means is varied substantially harmonically in accordance with such position.

5. A remote indicator system comprising a pair of conducting plates displaced from each other in parallel relationship, four elastic tubes disposed between said plates in parallel relationship with each other at substantially the corners of a square, each of said tubes containing an electrically resistive fluid, means securing the ends of said tubes to said plates in sealed relationship with the ends of the resistive fluid in contact therewith, a source of direct current connected between said supporting members, means extending through each of said tubes into contact with the resistive fluid at substantially its midpoint when in its normal position, a centrally apertured non-conducting plate attached to said contact means, a rotatable shaft member extending between said conducting plates centrally of said tubes and including arms extending through the aperture in said non-conducting plate to engage opposite sides thereof at diametrically opposite points, said arms being designed to tilt said non-conducting plate in accordance with their rotary position to harmonically shift the non-conducting plate and deform the said tubes, a pair of coils disposed in space quadrature, and means connecting each of said coils across the contact means of a different pair of opposite tubes.

LEWIS W. CHUBB.